J. Dickerson,
Wind Wheel,
Nº 26,345. Patented Dec. 6, 1859.
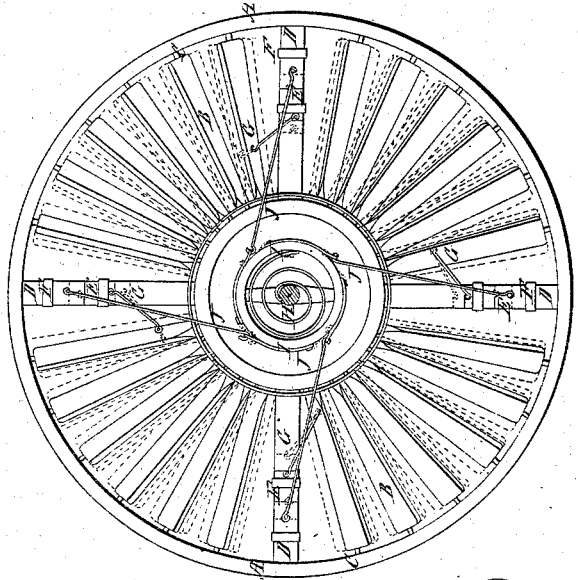
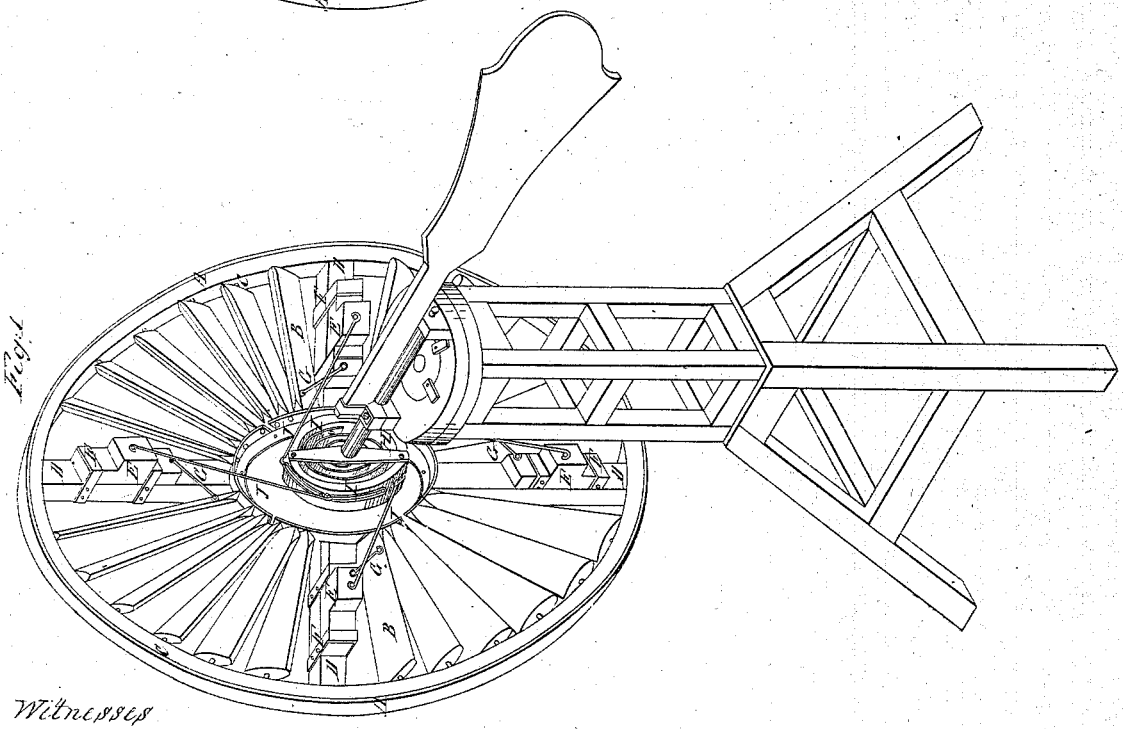
Witnesses
Livingston Couse
Alexander Mogowin
Inventor
Jacob Dickerson

UNITED STATES PATENT OFFICE.

JACOB DICKERSON, OF SACRAMENTO, CALIFORNIA.

WINDMILL.

Specification of Letters Patent No. 26,345, dated December 6, 1859.

*To all whom it may concern:*

Be it known that I, JACOB DICKERSON, of the city and county of Sacramento and State of California, have invented a new and useful Improvement in Windmills; and I do hereby declare that the following is a full, clear, and exact description of the same, reference being had to the accompanying drawings, forming a part of this specification, in which—

Figure 1, represents a perspective view of my improved wind mill, and Fig. 2, a view of the wind wheel in a horizontal position, detached from the shaft.

Similar letters of reference in each of the several figures indicate corresponding parts.

My invention relates to that character of wind mill which has its sails regulated by the centrifugal force resulting from the revolution of the wheel, and the improvement which I have made lessens the cost of construction and brings the parts of such wind mills more compactly together.

To enable others skilled in the art, to make and use my invention, I will proceed to describe its construction and operation.

A, represents the rim of the wheel, into which the outer end of the fan shaped wings or sails B, are fastened by an iron bolt C, the inner end being fastened in a similar manner to the periphery of the hub, so as to allow them to turn as may be required. This hub is formed by pieces of plank fitting into the angles formed by the crossing of the arms D. To these arms, are attached the slides E, secured to the arms by iron bands F, in such manner as to allow the slides to move back and forth upon the arms. It will be seen the wheel is thus divided into four quarters by the arms. In each space between the arms are six wings or sails. Six of these sails, three upon each side of each arm, are connected by a thin curved plate of iron $E^1$ at the inner end and near the inside edge of the sails, by a small bolt passing loosely through the iron so as to allow the sails to turn. These six sails thus securely fastened together are further connected by a rod G, passing from the slide E, to the controlling sail next the arm, thus connecting one fourth of the sails to each slide.

To the shaft of the wind wheel, is attached the inner end of a spring H, similar to the main-spring of a watch. The spring is inclosed in, and, the outer end fastened to the inside of a cylinder I, turning upon the shaft to which the spring is attached. This spring is connected with the slides E, E, by means of rods J, J, passing from the slides to near the cylinder, where they are connected to leather straps or cords, each of the straps or cords passing about one-fourth of the circumference around the cylinder, and then attaching thereto.

The red lines in Fig. 2, represent the sails when the largest surface is presented to the wind and the black lines parallel to them, when the least amount of surface is presented. The effect of this combination, will readily be perceived. The spring holds the slides to the nearest place to the shaft of the wind wheel to which they are designed to come and then the sails present the largest amount of surface to the wind. In case of a strong gale by which the velocity of the wheel would be too great, the centrifugal force thus brought into action forces out the slides from the center and thus turns the sails so as to present less surface, and consequently less resistance to the wind, thereby avoiding the danger of too great force upon the sails and consequent damage to machinery being driven. As the force of the wind current abates, the spring draws the slides back nearer the center and consequently turning the sails so as to again present a larger surface to the wind.

What I claim as my invention and desire to secure by Letters Patent, is—

The arrangement of the curved iron sections E', sails B, arms D, slides E, hollow drum I, scroll spring H, flexible connecting rods J, and links G, in the manner and for the purpose described.

JACOB DICKERSON.

Witnesses:
LIVINGSTON COUTE,
ALEXANDER McGOWAN.